US009188719B2

United States Patent
Lu et al.

(10) Patent No.: US 9,188,719 B2
(45) Date of Patent: Nov. 17, 2015

(54) MANUFACTURING METHOD AND TEMPLATE OF COLOR FILTERS

(71) Applicant: BOE TECHNOLOGY GROUP CO., LTD., Beijing (CN)

(72) Inventors: Jinbo Lu, Beijing (CN); Zhuo Zhang, Beijing (CN); Jisheng Zhao, Beijing (CN); Lin Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/126,508

(22) PCT Filed: Nov. 12, 2012

(86) PCT No.: PCT/CN2012/084473
§ 371 (c)(1),
(2) Date: Dec. 16, 2013

(87) PCT Pub. No.: WO2013/143293
PCT Pub. Date: Oct. 3, 2013

(65) Prior Publication Data
US 2014/0113067 A1 Apr. 24, 2014

(30) Foreign Application Priority Data
Mar. 26, 2012 (CN) .......................... 2012 1 0082966

(51) Int. Cl.
*G02B 5/26* (2006.01)
*G02B 5/20* (2006.01)
(52) U.S. Cl.
CPC . *G02B 5/26* (2013.01); *G02B 5/201* (2013.01)
(58) Field of Classification Search
CPC .................................. G02B 5/26; G02B 5/201
USPC .................... 427/68, 162, 271; 118/102, 313; 349/106
See application file for complete search history.

(56) References Cited

U.S. PATENT DOCUMENTS

2004/0196421 A1 10/2004 Hwang
2006/0127282 A1 6/2006 Yamashita et al.
(Continued)

FOREIGN PATENT DOCUMENTS

CN 1756798 A 4/2006
CN 102103224 A 6/2011
(Continued)

OTHER PUBLICATIONS

Written Opinion of the International Searching Authority dated Feb. 28, 2013 issued by the State Intellectual Property Office of the People's Republic of China in connection with PCT counterpart application, International Application No. PCT/CN2012/084473.
(Continued)

*Primary Examiner* — Alex A Rolland

(57) ABSTRACT

A manufacturing method and template of color filters belong to the field of liquid crystal display. The manufacturing method comprises: forming a black matrix (2) on a substrate (1), a pixel region being formed around the black matrix (2); forming pixel resin layers (3, 4, 5) on the substrate (1) on which the black matrix is formed; boxing the template with the substrate on which the pixel resin layers are formed, the template being located above the substrate (1), and a plurality of columnar hollow protrusions (13) being arranged at a part of a template body (12), corresponding to the pixel region, of the template; subjecting the boxed substrate to heat treatment, taking off the template so as to form a hole (11) in the pixel resin layer; and forming, through a patterning process, a pattern of the pixel resin layer on the substrate on which the hole (11) is provided. Therefore, the aperture and the opening area can be accurately controlled when providing an opening on the pixel region of the color filter.

15 Claims, 5 Drawing Sheets

(56) References Cited

U.S. PATENT DOCUMENTS

| | | |
|---|---|---|
| 2006/0290830 A1 | 12/2006 | Teramoto et al. |
| 2010/0071619 A1* | 3/2010 | Robertson et al. ............ 118/629 |

FOREIGN PATENT DOCUMENTS

| | | |
|---|---|---|
| CN | 10235678 A | 7/2011 |
| CN | 102135634 A | 7/2011 |
| JP | H0933713 A | 2/1997 |
| JP | H10307288 A | 11/1998 |
| JP | 2000056122 A | 2/2000 |
| JP | 2007136790 A | 6/2007 |

OTHER PUBLICATIONS

English translation of Written Opinion of the International Searching Authority dated Feb. 28, 2013 issued by the State Intellectual Property Office of the People's Republic of China in connection with PCT counterpart application, International Application No. PCT/CN2012/084473.
Espacenet Abstract of CN10235678A; 1 page.
Espacenet Abstract of CN102135634; 1 page.
Espacenet Abstract of JP2000056122A; 1 page.
Espacenet Abstract of JPH10307288A; 1 page.
Espacenet Abstract of CN102103224A; 1 page.
Espacenet Abstract of JPH0933713A; 1 page.
First Office Action issued by the Chinese Patent Office for Chinese Patent Application No. 201210082966.5 dated Oct. 21, 2013, 5 pgs.
English translation of First Office Action issued by the Chinese Patent Office for Chinese Patent Application No. 201210082966.5 dated Oct. 21, 2013, 2 pgs.
English Abstract of CN1756798A (listed above); 2 pgs.
English Abstract of JP2007136790A (listed above); 1 pg.
English Abstract of JP5351262 (listed above); 1 pg.
Extended European Search Report issued by European Patent Office, in European Patent Office, in European patent application No. 12873374.8, dated Aug. 20, 2015, 8 pages.

* cited by examiner

MANUFACTURING METHOD AND TEMPLATE OF COLOR FILTERS

CROSS REFERENCE TO RELATED APPLICATIONS

This application is based on International Application No. PCT/CN2012/084473 filed on Nov. 12, 2012, which claims priority to Chinese National Application No. 201210082966.5 filed on Mar. 26, 2012, the contents of which are incorporated herein by reference.

TECHNICAL FIELD

The present disclosure relates to a technical field of a liquid crystal display, especially to a method for manufacturing color filters and a template.

BACKGROUND

Forming apertures in the pixel region of the color filters is often adopted in the conventional technique to realize greater transmissivity and brightness of the color filters, and in particular, it is widely used in the production of transflective color filters. In order to obtain color images with high quality in both bright and dark environments, consideration shall be given to both the reflection performance and transmission performance of the transflective color filters, and both performances require possibly high brightness and color saturation of the color filters. Therefore, to balance the brightness and the color saturation, the conventional techniques usually adopt the way of forming apertures in the reflection region.

Conventionally, process of forming apertures is realized by using a mask etched with aperture patterns, and forming apertures in the pixel resin layer (color resin layer) of the reflection region by exposure and development processes. It is not easy to control the size of the apertures, which greatly increases the difficulty of manufacturing; on the other hand, difficulty in controlling the size of the apertures can result in the uncertainty of the aperture area and may result in the deviation of the resulted color from the design value.

SUMMARY

The present disclosure provides a method of manufacturing color filters and a template, which can accurately control the aperture size and the area of aperture when the apertures are formed in the pixel region of the color filter.

According to an aspect, the embodiments of the disclosure provide a method of manufacturing a color filter. The method comprises: forming a black matrix on a substrate, wherein the black matrix defines pixel regions; forming pixel resin layers within the pixel regions; bonding the template with the substrate having the pixel resin layers to form a cell, wherein the template is located above the substrate, and includes a template body and a plurality of columnar hollow protrusions arranged thereon, the plurality of columnar hollow protrusions corresponds to the pixel regions of the color filter; removing the template after heat treating the bonded substrate, so as to form apertures in the pixel resin layers; and forming a pattern of the pixel resin layers by patterning process. According to the present disclosure, the pore size and the area of apertures can be accurately controlled when apertures are formed in the pixel regions of the color filter.

According to an example, the manufacturing method further comprises forming a transparent conductive layer over the black matrix and the pixel resin layers, and forming columnar spacer(s) on the transparent conductive layer.

According to an example, the manufacturing method further comprises forming a transparent protective layer between the black matrix and the pixel resin layers, and the transparent conductive layer.

According to an example, the columnar hollow protrusions are vertically provided on the template body, wherein the columnar hollow protrusions are parallel to each other.

According to an example, the color filter is a transflective color filter; and the columnar hollow protrusions correspond to a reflective region of the pixel regions.

According to an example, the columnar hollow protrusions has a height of 3-8 μm.

According to an example, the cross section of the columnar hollow protrusion is a circular, and the hollow pore diameter is 1-10 μm.

According to an example, the temperature of the heat treatment is 80-120° C.

According to an example, the template has alignment mark(s) for aligning with the substrate before forming the apertures.

According to another aspect, the embodiments of the disclosure provide a template of forming apertures in pixel regions of a color filter. The template comprises: a template body; and a plurality of columnar hollow protrusions formed on the template body, wherein the columnar hollow protrusions correspond to the pixel regions of the color filter.

Compared with the conventional techniques, the present disclosure comprises bonding the template having columnar hollow protrusions with a substrate having pixel resin layers to form a cell, wherein the template is located above the substrate; flowing the pixel resin into hollow spaces of the columnar hollow protrusions under the effect of capillary stress; and removing the template after the heat treatment and solidification, so that pores are formed in the pixel resin layers. By using a template to form apertures in the pixel regions in the present disclosure, it can avoid problems of uneven pore size and difficulty in controlling the aperture area when the apertures are formed by exposure and development in the prior art.

BRIEF DESCRIPTION OF THE DRAWINGS

In order to clearly illustrate the technical solution of the embodiments of the present invention or the conventional techniques, the accompanying drawings will be briefly described below. It is apparent that the described drawings are for illustrating some embodiments of the invention. Those ordinary skilled in the art can obtain other drawings according to these drawings without creative labor.

DETAILED DESCRIPTION

The technical solutions of the embodiments will be described in a clearly and fully understandable way in connection with the drawings related to the embodiments of the disclosure. It is apparent that the described embodiments are just a part but not all of the embodiments of the invention. Based on the described embodiments, other embodiments contemplated by an ordinary person in the art without inventive work, shall be within the scope of the present invention.

Embodiments of the disclosure provide a method of manufacturing a color filter, comprising: bonding the template having columnar hollow protrusions with a substrate having pixel resin layers to form a cell, wherein the template is located above the substrate; flowing the pixel resin into hollow spaces of the columnar hollow protrusions under the effect of capillary stress; and removing the template after the heat treatment and solidification, so that pores/apertures are formed in the pixel resin layers. By using a template to form apertures in the pixel regions in the present disclosure, it can avoid problems of uneven pore size and difficulty in controlling the aperture area when the apertures are formed by exposure and development in the prior art. Since the pore size and aperture area can be accurately controlled, the technical problem of color deviation in the prior art can be solved.

The implementations of the present disclosure is demonstrated by an example of forming apertures in the transflective area of a color filter, but is not limited to the example, and the method of the disclosure is also applicable to form apertures in pixel region(s) of a total transmissive color filter.

Figure 1:
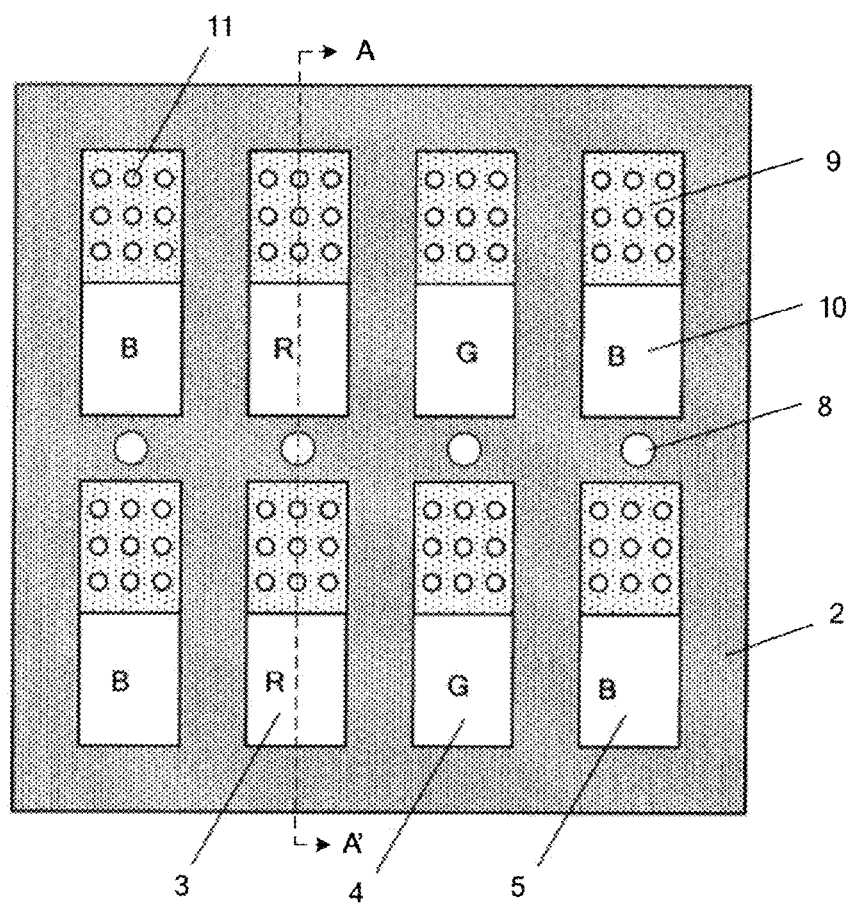
FIG. 1 is a top view of a color filter according to an embodiment of the disclosure.
Figure 2:
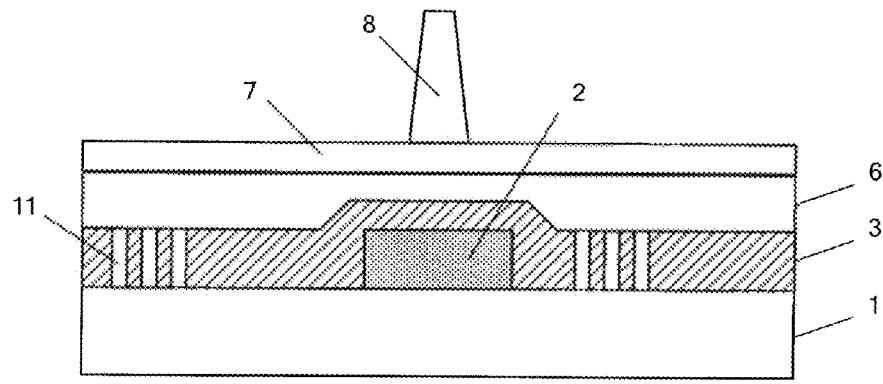
FIG. 2 is a sectional view of the color filter as shown in FIG. 1 along line A-A'.

FIGS. 1 and 2 illustrate structure of a transflective color filter formed according to an embodiment of the disclosure. The transflective color filter comprises: a substrate 1, a black matrix 2 formed on the substrate 1, pixel resin layers (comprising a red pixel resin layer 3, a green pixel resin layer 4 and a blue pixel resin layer 5) formed within pixel regions defined by the black matrix 2; a transparent protective layer 6 formed over the black matrix 2 and the pixel resin layers; a transparent conductive layer 7 formed on the transparent protective layer 6, and columnar spacer(s) 8 formed on the transparent conductive layer 7. Each of the pixel resin layers comprises a reflective region 9 and a transmissive region 10, and the reflective region 9 is provided with apertures 11.

Figure 7:
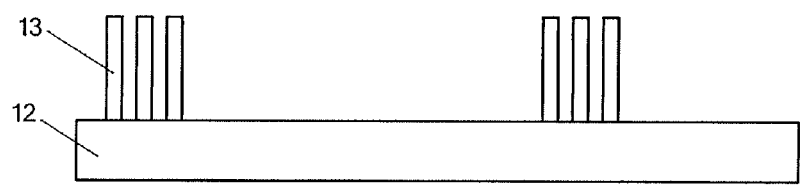
FIG. 7 is a sectional view of a template according to an embodiment of the disclosure.
Figure 8:
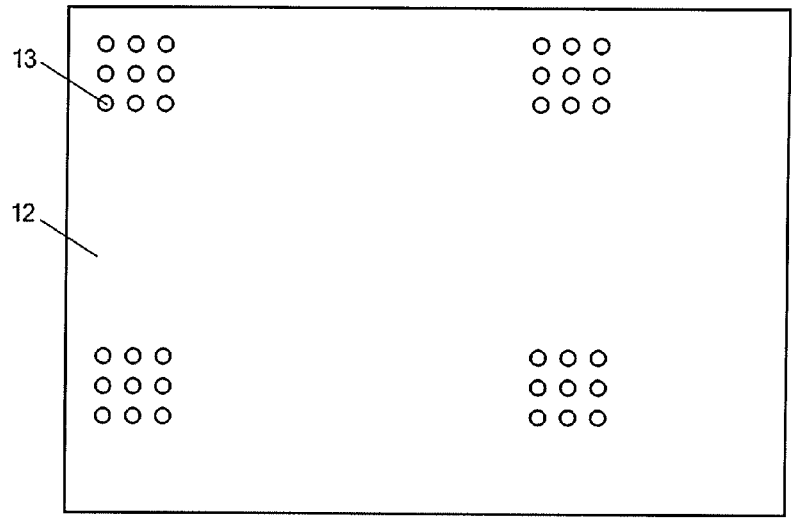
FIG. 8 is a top view of the template according to an embodiment of the disclosure.

FIGS. 7 and 8 illustrate a template used to form apertures in the pixel regions of a color filter according to an embodiment of the disclosure. The template may comprise a template body 12 and a plurality of columnar hollow protrusions 13 formed on the template body 12.

The columnar hollow protrusions 13 are vertically provided on the template body 12, and the columnar hollow protrusions are parallel to each other.

When the color filter is a transflective color filter; the columnar hollow protrusions 13 correspond to the reflective region of the pixel regions. Furthermore, the template body 12 may be provided with alignment mark(s) (not shown) for aligning with the substrate of the color filter before forming the apertures.

Figure 9:
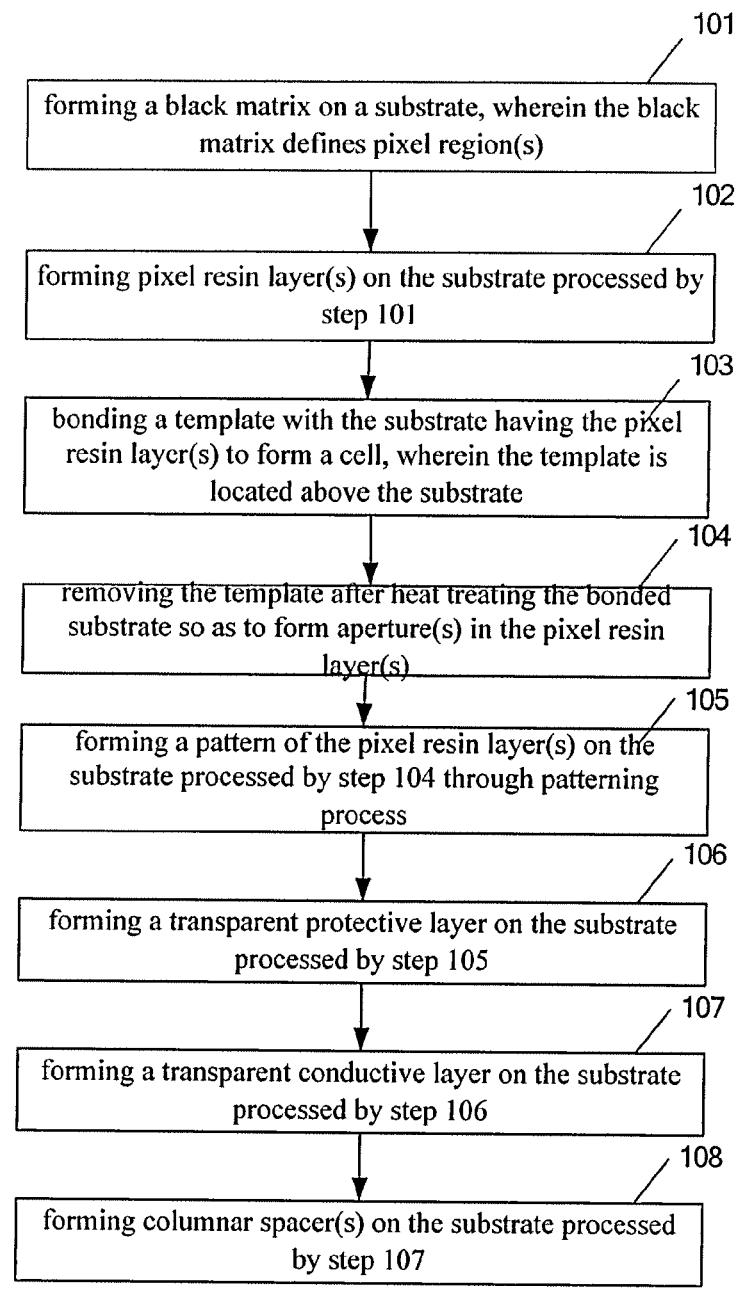
FIG. 9 is a flow diagram of a method of manufacturing a color filter according to an embodiment of the disclosure.

Referring to FIG. 9, the method of manufacturing a color filter according to an embodiment of the disclosure may comprise:

Step 101: forming a black matrix on a substrate, wherein the black matrix defines pixel region(s).

Figure 3:
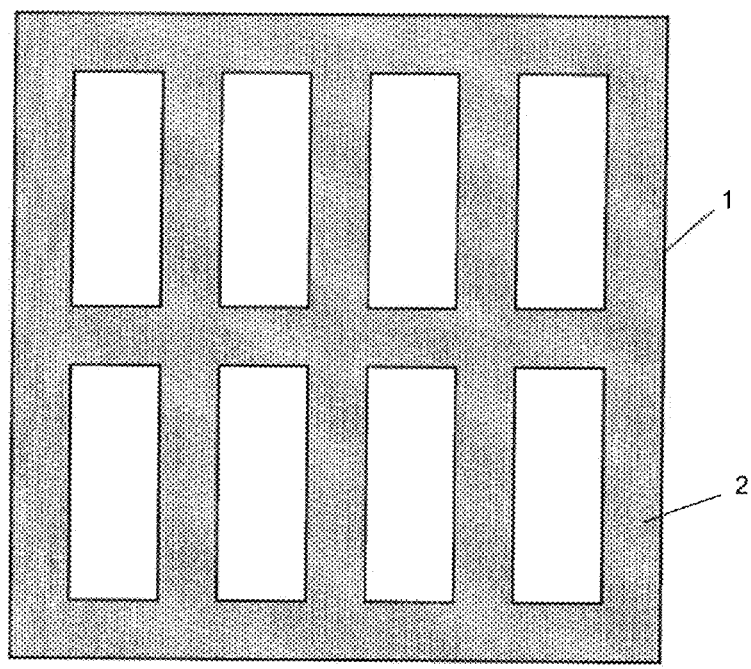
FIG. 3 is a top view of the color filter provided with black matrix pattern according to an embodiment of the disclosure.

The substrate can be a glass substrate or other transparent substrates. As shown in FIG. 3, the black matrix may be formed by spin-coating or blade-coating the black matrix material layers of photoresist, and the substrate is exposed by using the mask engraved with pattern, then the exposed substrate is developed to obtain the pattern of the black matrix, wherein the pattern of the black matrix can have a thickness of 1-5 μm.

Step 102: pixel resin layer(s) is/are formed on the substrate after step 101 is done;

Step 103: the above template is bonded with the substrate having the pixel resin layer(s) to form a cell, wherein the template is located above the substrate.

As described, the template is provided with alignment mark(s) to realize the template bonding with the substrate. The template body of the template has columnar hollow protrusions uniformly arranged in the reflective region of the pixel regions, the columnar hollow protrusions can have a height of 3-8 μm. In the present embodiment, the cross section of the columnar hollow protrusions is circular, and the hollow pore diameter can be 1-10 μm. After the cell is formed, the pixel resin flows into hollow spaces of the columnar hollow protrusions under the effect of capillary stress.

Step 104: the template is removed after heat treating the bonded substrate, so as to form aperture(s) in the pixel resin layer(s).

The temperature of the heat treatment (i.e. the pre-baking treatment in the photolithographic process) can be 80-120° C. The template is removed after the pixel resin is heat treated and solidified, so that aperture(s) is/are formed uniformly in the reflective region(s).

It is understood that the cross section of the columnar hollow protrusions can be a polygon. Furthermore, the distribution of the columnar hollow protrusions is not limited to regular arrangement, but they are need to be arranged uniformly, and the number of the columnar hollow protrusions can be adjusted according to the total area of the apertures in the reflective region.

Figure 4:
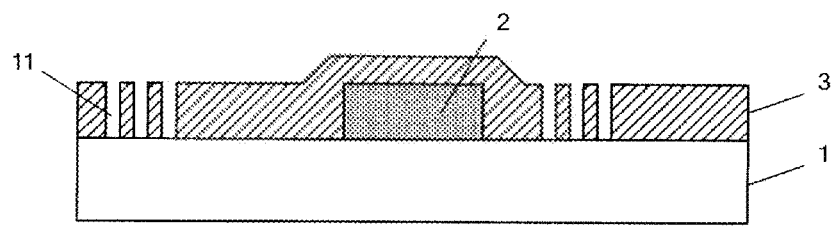
FIG. 4 is a sectional view of the color filter provided with a pixel resin layer according to an embodiment of the disclosure.

Step 105: a pattern of the pixel resin layer(s) is/are formed on the substrate through the patterning process after step 104 is done;

The substrate can be exposed by using a mask with pattern, then the exposed substrate is developed to obtain the pattern of the pixel resin layer (as shown in FIG. 4). In the present embodiment, the ratio of the thickness of the pixel resin layer in the reflective region and in the transmissive region can be 1:3~1:1. An ordinary person in the art will know that the gray-scale mask can be used to expose the substrate so that the reflective region has a different thickness from the transmissive region.

Furthermore, the above steps 102-105 can be performed repeatedly, and one color of pixel resin layer is formed every time the steps 102-105 are performed. For example, the red pixel resin layer can be firstly coated on the substrate, and the pattern of the red pixel resin layer is formed according to the above method; then the green pixel resin layer is coated on the substrate, and the pattern of the green pixel resin layer is formed according to the above method; finally, the blue pixel resin layer is coated on the substrate, and the pattern of the blue pixel resin layer is formed according to the above method.

Figure 5:
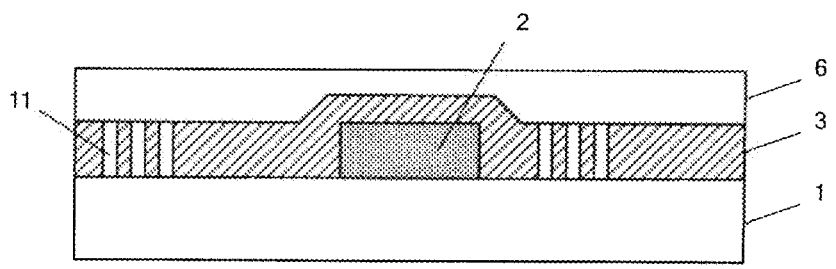
FIG. 5 is a sectional view of the color filter provided with a transparent protective layer according to an embodiment of the disclosure.

Step 106: a transparent protective layer is formed on the substrate after step 105 is done;

The transparent protective layer 6 can be formed by using coating, baking process and the like (as shown in FIG. 5).

Figure 6:
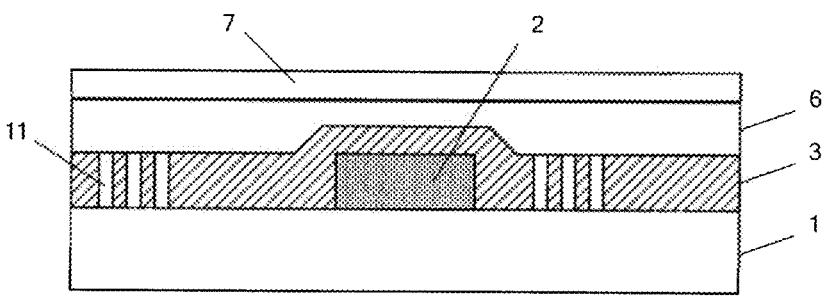
FIG. 6 is a sectional view of the color filter provided with a transparent conductive layer according to an embodiment of the disclosure.

Step 107: a transparent conductive layer is formed on the substrate after step 106 is done;

The transparent conductive layer 7 can be formed by using depositing or electroplating process (as shown in FIG. 6), which has a thickness of 500-2000 Å.

Step 108: columnar spacer(s) is/are formed on the substrate after step 107 is done;

The columnar spacer(s) 8 can be formed by using photolithographic process. Specifically, after step 107, the columnar spacer layer made of the photoresist is coated on the substrate, and then the exposure and development process are performed to finally form the columnar spacer(s). The cross section of the columnar spacer connecting with the color filter can have a diameter of 15-20 μm; and the other end of the columnar spacer can have a cross-sectional diameter of 5-10 μm; and the columnar spacer can have a height of 5-10 μm (as shown in FIG. 2).

Furthermore, the steps 106 and 107 can be selected according to particular situation. For example, when the color filter does not include a transparent protective layer, the step 106 can be omitted; when the color filter does not include a transparent conductive layer, the step 107 can be omitted.

In general, the embodiment of the disclosure provides a method of forming apertures, comprising: bonding the template having columnar hollow protrusions with a substrate having pixel resin layers to form a cell, wherein the template is located above the substrate; flowing the pixel resin into hollow spaces of the columnar hollow protrusions under the effect of capillary stress; and removing the template after the heat treatment and solidification, so that pores are formed in the pixel resin layers. By using a template to form apertures in the pixel regions in the present disclosure, it can avoid problems of uneven pore size and difficulty in controlling the aperture area when the apertures are formed by exposure and development in the prior art. Since the pore size and aperture area can be accurately controlled, the technical problem of color deviation in the prior art can be solved.

The above embodiments are used for illustrating the technical solutions of the present invention only and not intended to limit the scope of the invention. It will be understood by an ordinary person in the art that many changes and variations may be made therein without departing from the spirit and scope of the present invention. And thus these changes, variations and equivalent thereof belong to the scope of the present invention, as defined by the appended claims.

What is claimed is:

1. A method of manufacturing a color filter, comprising:
   forming a black matrix on a substrate, wherein the black matrix defines pixel regions;
   forming pixel resin layers within the pixel regions;
   bonding a template with the substrate having the pixel resin layers to form a cell, wherein the template is located above the substrate and includes a template body and a plurality of columnar hollow protrusions on the template body, the plurality of columnar hollow protrusions correspond to the pixel regions of the color filter;
   removing the template including the plurality of columnar hollow protrusions after heat treating the bonded substrate so as to form apertures at positions corresponding to positions initially located by the columnar hollow protrusions in the pixel resin layers; and
   forming a pattern of the pixel resin layers by patterning process.

2. The method of claim 1, further comprising flowing the pixel resin into hollow spaces of the plurality of the columnar hollow protrusions under effect of capillary stress after the cell is formed.

3. The manufacturing method of claim 2, further comprising: forming a transparent conductive layer over the black matrix and the pixel resin layers; and forming a columnar spacer on the transparent conductive layer.

4. The manufacturing method of claim 3, further comprising: forming a transparent protective layer between the black matrix and the pixel resin layers, and the transparent conductive layer.

5. The manufacturing method of claim 4, wherein the columnar hollow protrusions are vertically provided on the template body and the columnar hollow protrusions are parallel to each other.

6. The manufacturing method of any of claims 4, wherein the color filter is a transflective color filter; and the columnar hollow protrusions correspond to a reflective region of the pixel regions.

7. The manufacturing method of claim 3, wherein the columnar hollow protrusions are vertically provided on the template body and the columnar hollow protrusions are parallel to each other.

8. The manufacturing method of any of claims 3, wherein the color filter is a transflective color filter; and the columnar hollow protrusions correspond to a reflective region of the pixel regions.

9. The manufacturing method of claim 2, wherein the columnar hollow protrusions are vertically provided on the template body and the columnar hollow protrusions are parallel to each other.

10. The manufacturing method of any of claims 9, wherein the color filter is a transflective color filter; and the columnar hollow protrusions correspond to a reflective region of the pixel regions.

11. The manufacturing method of claim 2, wherein the color filter is a transflective color filter; and the columnar hollow protrusions correspond to a reflective region of the pixel regions.

12. The manufacturing method of claim 2, wherein the columnar hollow protrusions has a height of 3-8 μm.

13. The manufacturing method of claim 2, wherein the cross section of the columnar hollow protrusion is a circular, and the hollow pore diameter is 1-10 μm.

14. The manufacturing method of claim 2, wherein the temperature of the heat treatment is 80-120° C.

15. The manufacturing method of claim 2, wherein the template has alignment mark(s) for aligning with the substrate before forming the apertures.

\* \* \* \* \*